United States Patent
Hosomi

(10) Patent No.: US 7,349,031 B2
(45) Date of Patent: Mar. 25, 2008

(54) TELEVISION RECEIVER

(75) Inventor: Tatsuya Hosomi, Kawanishi (JP)

(73) Assignee: Sanyo Electric Co., Ltd., Osaka (JP)

(*) Notice: Subject to any disclaimer, the term of this patent is extended or adjusted under 35 U.S.C. 154(b) by 482 days.

(21) Appl. No.: 10/830,027

(22) Filed: Apr. 23, 2004

(65) Prior Publication Data

US 2004/0212736 A1    Oct. 28, 2004

(30) Foreign Application Priority Data

Apr. 25, 2003   (JP) ............................. 2003-122527

(51) Int. Cl.
*H04N 5/46* (2006.01)

(52) U.S. Cl. ...................................... 348/558

(58) Field of Classification Search ................ 348/558, 348/556, 913, 468
See application file for complete search history.

(56) References Cited

U.S. PATENT DOCUMENTS

| | | | | |
|---|---|---|---|---|
| 5,486,871 A * | 1/1996 | Filliman et al. | ............ | 348/558 |
| 5,973,749 A * | 10/1999 | Ishii et al. | ................... | 348/558 |
| 6,208,385 B1 * | 3/2001 | Konishi et al. | ............ | 348/558 |
| 6,366,706 B1 * | 4/2002 | Weitbruch | ................... | 382/254 |
| 6,870,573 B2 * | 3/2005 | Yeo et al. | ................... | 348/569 |
| 6,947,097 B1 * | 9/2005 | Joanblanq | ................... | 348/558 |
| 6,977,963 B1 * | 12/2005 | Shiiyama | ............... | 375/240.24 |
| 7,023,490 B2 * | 4/2006 | Konuma | ..................... | 348/558 |
| 7,046,302 B2 * | 5/2006 | Konuma | ..................... | 348/558 |

FOREIGN PATENT DOCUMENTS

| | | |
|---|---|---|
| JP | 05-260407 | 10/1993 |
| JP | 7-46510 | 2/1995 |
| JP | 2002-202411 | 7/2002 |
| JP | 2002-267844 | 9/2002 |
| JP | 2002-326278 | 11/2002 |

OTHER PUBLICATIONS

Notice of Rejection, dated Mar. 14, 2006 for Application No. JP 2003-122527.

* cited by examiner

*Primary Examiner*—Paulos M. Natnael
(74) *Attorney, Agent, or Firm*—Westerman, Hattori, Daniels & Adrian, LLP.

(57) ABSTRACT

A television receiver having the function of displaying a plurality of types of television program videos which differ in the aspect ratio comprises means for judging, when channels are switched, whether or not a letter box is displayed on the previous channel and is also displayed on the new channel, and means for moving, when it is judged that the letter box is displayed on the previous channel and is also displayed on the new channel, the position of the letter box displayed on the new channel from the position of the letter box displayed on the previous channel.

6 Claims, 14 Drawing Sheets

TELEVISION RECEIVER

BACKGROUND OF THE INVENTION

1. Field of the Invention

The present invention relates to a television receiver having the function of displaying a plurality of types of images which differ in the aspect ratio.

2. Description of the Background Art

In digital television broadcasting, not only a television program video having a standard aspect ratio of 3:4 but also a television program video having an aspect ratio of 9:16, for example, a high-definition television program video is broadcast.

JP07-46510, A discloses a television receiver selectively assuming a state where an image reproducing operation is performed on the basis of a high-definition television video signal having an aspect ratio of 9:16 and a state where an image reproducing operation is performed on the basis of an NTSC (National Television System Committee) video signal having an aspect ratio of 3:4.

In such a television receiver, a video signal processing circuit for the high-definition television video signal and a video signal processing circuit for the NTSC video signal are selectively connected to a common image display unit, and an image reproducing video signal based on the high-definition television video signal or an image reproducing video signal based on the NTSC video signal are fed to the image display unit.

When the video signal is fed to the image display unit, a vertical deflection signal and a horizontal deflection signal are fed to a deflecting coil provided in the image display unit. When the image reproducing video signal based on the high-definition television video signal is fed to the image display unit, a vertical deflection signal having a frequency of 60 Hz and a horizontal deflection signal having a frequency of 33.75 kHz are fed to the deflecting coil in correspondence with a field frequency 60 Hz and a line frequency 33.75 kHz which the high-definition television video signal has. On the other hand, when the image reproducing video signal based on the NTSC video signal is fed to the image display unit, a vertical deflection signal having a frequency of 60 Hz and a horizontal deflection signal having a frequency of 15.75 kHz are fed to the deflecting coil in correspondence with a field frequency 60 Hz and a line frequency 15.75 kHz which the NTSC video signal has.

In this case, an image reproducing video signal based on a high-definition television video signal forming a screen having an aspect ratio of 9:16 and an image reproducing video signal based on an NTSC video signal forming a screen having an aspect ratio of 3:4 are selectively fed to the common image display unit. A state where a reproduced image corresponding to the high-definition television video signal is obtained on the image display unit or a state where a reproduced image corresponding to the NTSC video signal is obtained thereon is assumed. In either one of the states, a portion where no image is displayed is formed in the image display unit.

In a television receiver comprising an image display unit 10 having an aspect ratio of 3:4, for example, when a television program video having an aspect ratio of 3:4 is displayed, the television program video is displayed on the whole of a display area of the image display unit 10. When a television program video having an aspect ratio of 9:16 is displayed, however, the television program video is displayed inside both upper and lower side edges of the display area of the image display unit 10, as shown in FIG. 1a. Accordingly, portions where no television program video is displayed respectively appear in the upper and lower side edges of the display area of the image display unit 10. In the portions where no television program video is displayed, black bands (letter boxes) 11 are respectively on-screen displayed.

On the other hand, in a television receiver comprising an image display unit 20 having an aspect ratio of 9:16, when a television program video having an aspect ratio of 9:16 is displayed, the television program video is displayed on the whole of a display area of the image display unit 20. When a television program video having an aspect ratio of 3:4 is displayed, however, the television program video is displayed inside both left and right side edges of the display area of the image display unit 20, as shown in FIG. 1b. Accordingly, portions where no television program video is displayed respectively appear in the left and right side edges of the display area of the image display unit 20. In the portions where no television program video is displayed, black bands (side panels) 21 are respectively on-screen displayed.

Under circumstances where a state where the portion where no image is displayed is thus formed on the image display unit is assumed in displaying the reproduced image by the image display unit, when the accumulation time in the state is relatively increased, there occurs a difference in luminescent capability between a portion where no image is displayed (a first area) and a portion where an image is displayed (a second area) in the image display unit because the degree of reduction in the luminescent capability in the second area is higher than that in the first area.

When screen display is performed over the whole surface of the image display unit under circumstances where the difference in luminescent capability thus occurs, luminance in the second area is lower than luminance in the first area so that there occurs a luminance difference between the first area and the second area. In the boundary between the first area and the second area, a stripe-shaped trace, i.e., burn-in is conspicuous due to the luminance difference.

Disclosed as a technique for effectively reducing the degree of the burn-in is a technique for reciprocating the position of an edge in the horizontal direction or the vertical direction of a screen on which a reproduced image is formed in an image display unit in a relatively small movement range in a predetermined long period. That is, as a method of reducing burn-in in an image display unit by a side panel or a letter box used when programs having different aspect ratios are displayed, the side panel or the letter box is moved by slightly moving a deflection circuit.

SUMMARY OF THE INVENTION

In recent years, a liquid crystal panel, a plasma display panel (PDP), an organic EL panel, etc. have been employed as an alternative to a Brawn tube (a cathode-ray tube). In the Brawn tube, a deflection circuit can be slightly moved. Even if a side panel or a letter box is moved in a long period, therefore, a viewer does not have an uncomfortable feeling. When burn-in in a display panel is reduced in the same method as that in the above-mentioned prior art with respect to the liquid crystal panel, the PDP, and the organic EL panel, however, the side panel or the letter box must be moved in pixel units. Therefore, the movement gives an uncomfortable feeling to the viewer. An object of the present invention is to reduce the uncomfortable feeling.

In a television receiver having the function of displaying a plurality of types of television program videos which differ in the aspect ratio, a first television receiver according to the present invention is characterized by comprising means for judging, when channels are switched, whether or not a letter box is displayed on the previous channel and is also displayed on the new channel; and means for moving, when it is judged that the letter box is displayed on the previous channel and is also displayed on the new channel, the position of the letter box displayed on the new channel from the position of the letter box displayed on the previous channel.

In a television receiver having the function of displaying a plurality of types of television program videos which differ in the aspect ratio, a second television receiver according to the present invention is characterized by comprising means for judging, when channels are switched, whether or not a side panel is displayed on the previous channel and is also displayed on the new channel; and means for moving, when it is judged that the side panel is displayed on the previous channel and is also displayed on the new channel, the position of the side panel displayed on the new channel from the position of the side panel displayed on the previous channel.

In a television receiver having the function of displaying a plurality of types of television program videos which differ in the aspect ratio, a third television receiver according to the present invention is characterized by comprising calculation means for calculating, when a letter box is displayed, the average value of luminances in areas respectively composed of upper and lower side edges in the television program video; and means for moving, when the average value of the luminances which is calculated by the calculation means is lower than a predetermined value, the display position of the letter box.

In a television receiver having the function of displaying a plurality of types of television program videos which differ in the aspect ratio, a fourth television receiver according to the present invention is characterized by comprising calculation means for calculating, when a side panel is displayed, the average value of luminances in areas respectively composed of left and right side edges in the television program video; and means for moving, when the average value of the luminances which is calculated by the calculation means is lower than a predetermined value, the display position of the side panel.

In a television receiver having the function of displaying a plurality of types of television program videos which differ in the aspect ratio, a fifth television receiver according to the present invention is characterized by comprising scene change detection means for detecting, when a letter box is displayed, that a scene change occurs; and means for moving, when the scene change detection means detects that the scene change occurs, the display position of the letter box.

In a television receiver having the function of displaying a plurality of types of television program videos which differ in the aspect ratio, a sixth television receiver according to the present invention is characterized by comprising scene change detection means for detecting, when a side panel is displayed, that a scene change occurs; and means for moving, when the scene change detection means detects that the scene change occurs, the display position of the side panel.

In the first television receiver or the second television receiver according to the present invention, when the channels are switched, the display position of the letter box or the side panel is moved. Accordingly, the movement is not easily recognized by a viewer. When the display position of the letter box or the side panel is moved, therefore, no uncomfortable feeling is given to the viewer.

In the third television receiver or the fourth television receiver according to the present invention, when the average value of the luminances in the areas respectively composed of the upper edge and the lower edge (or the left edge and the right edge) in the television program video is lower than the predetermined value, that is, when the luminances in the upper edge and the lower edge in the television program video are close to the luminance of the letter box (or the side panel) in a state where the letter box (or the side panel) is displayed, the display position of the letter box (or the side panel) is moved, so that the movement is not easily recognized by a viewer. When the display position of the letter box or the side panel is moved, therefore, no uncomfortable feeling is given to the viewer.

In the fifth television receiver or the sixth television receiver according to the present invention, when the scene change occurs in a state where the letter box (or the side panel) is displayed, the display position of the letter box (or the side panel) is moved. Accordingly, the movement is not easily recognized by a viewer. When the display position of the letter box or the side panel is moved, therefore, no uncomfortable feeling is given to the viewer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
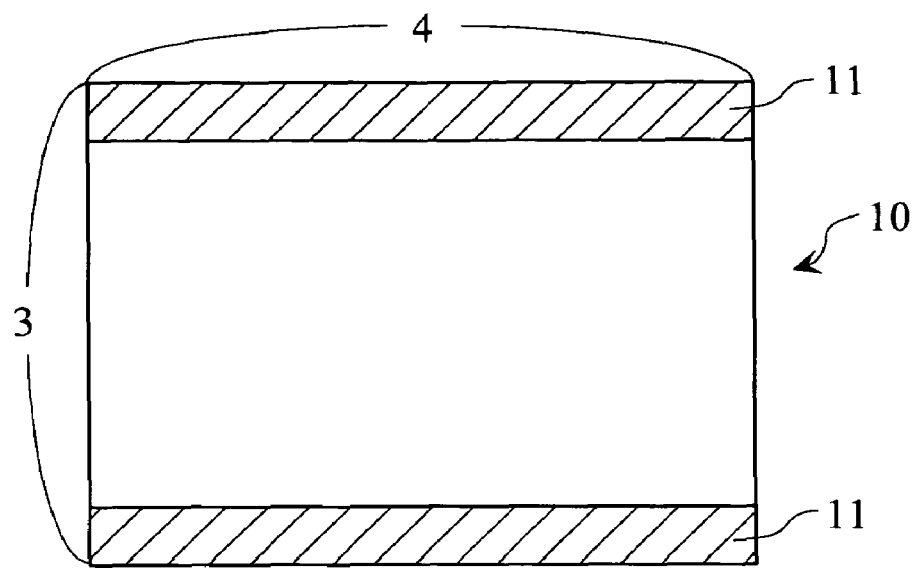
FIGS. 1a and 1b are schematic views respectively showing a state where a letter box is displayed and a state where a side panel is displayed.

Referring now to the drawings, description is now made of an embodiment in a case where the present invention is applied to a television receiver comprising a liquid crystal panel.

[1] Description of First Embodiment

Figure 2:
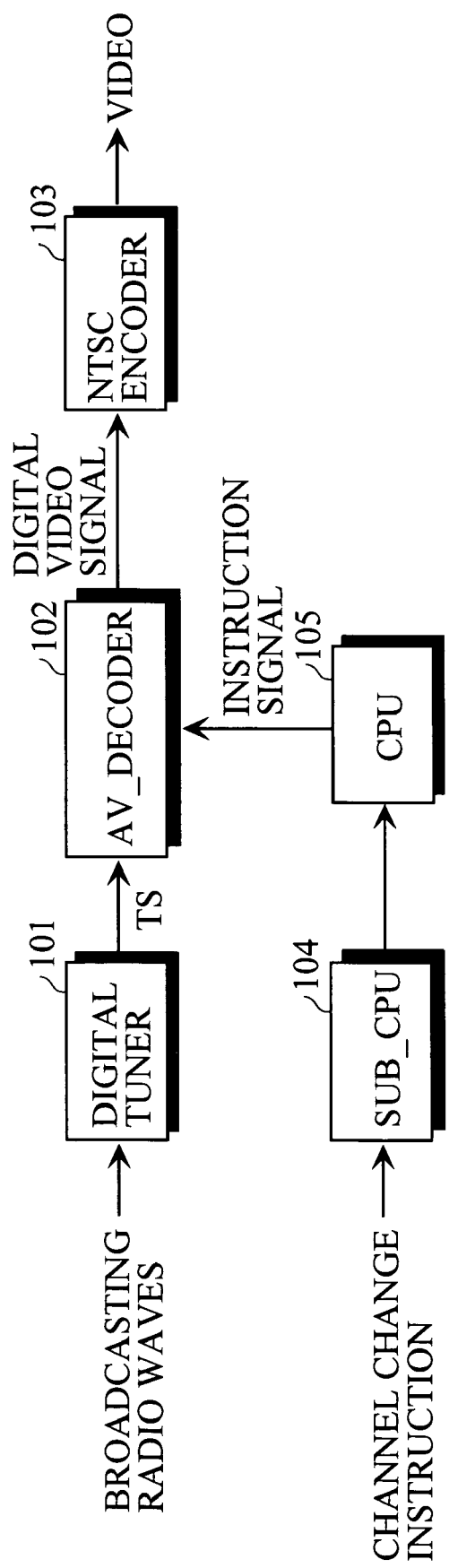
FIG. 2 is a block diagram showing the configuration of a television receiver according to a first embodiment.

FIG. 2 illustrates the configuration of a television receiver according to a first embodiment.

The television receiver comprises the function of performing an image reproducing operation on the basis of a high-definition television video signal having an aspect ratio of 9:16 and the function of performing an image reproducing operation on the basis of an NTSC video signal having an aspect ratio of 3:4.

Broadcasting radio waves are inputted to a digital TUNER (101) and a transport stream (hereinafter referred to as TS) is outputted to an AV_DECODER (102) from the digital TUNER (101). The AV_DECODER (102) which has received the TS outputs a digital video signal to an NTSC encoder (103). The NTSC encoder (103) which has received the digital video signal outputs a video and reflects the video on a TV set.

[1-1] Description of Case where there is Provided Liquid Crystal Panel Having Aspect Ratio of 3:4

It is assumed that the television receiver comprises a liquid crystal panel having an aspect ratio of 3:4. When a television program video having an aspect ratio of 3:4 is displayed, the television program video is displayed on the whole of a display area of the liquid crystal panel. When a television program video having an aspect ratio of 9:16 is displayed, the television program video is displayed inside both upper and lower side edges of the display area of the liquid crystal panel, and letter boxes 11 are respectively displayed in the upper and lower side edges of the display area of the liquid crystal panel, as shown in FIG. 1a.

The letter boxes 11 are displayed, as shown in FIG. 1a, in the liquid crystal panel. When a channel change instruction signal is outputted to a SUB_CPU (104) from a remote control (not shown), the channel change instruction signal is outputted to a CPU (105) from the SUB_CPU (104).

The CPU (105) reads information related to a channel newly inputted, and judges whether or not letter boxes must be displayed on the new channel, as on the previous channel. When the letter boxes need not be displayed, the instruction signal is fed to the AV_DECODER (102) as usual, to display a designated program.

When it is judged that letter boxes must be also displayed on the new channel, as on the previous channel, the instruction signal is outputted from the CPU (105) to the AV_DECODER (102) such that the position of the letter box, which is displayed by an on screen display (hereinafter referred to as OSD), is slightly moved, as compared with the position where it is displayed on the previous channel. The AV_DECODER (102) which has received the instruction signal outputs to the NTSC encoder (103) the digital video signal in a state where the position of the letter box displayed on the previous channel is slightly shifted, and the NTSC encoder (103) which has received the digital video signal outputs the video and reflects the video on the TV set.

That is, when the channels are switched, the letter boxes are displayed before switching the channels. When the letter boxes are displayed even after switching the channels, the display position of the letter box is moved.

Figure 3:
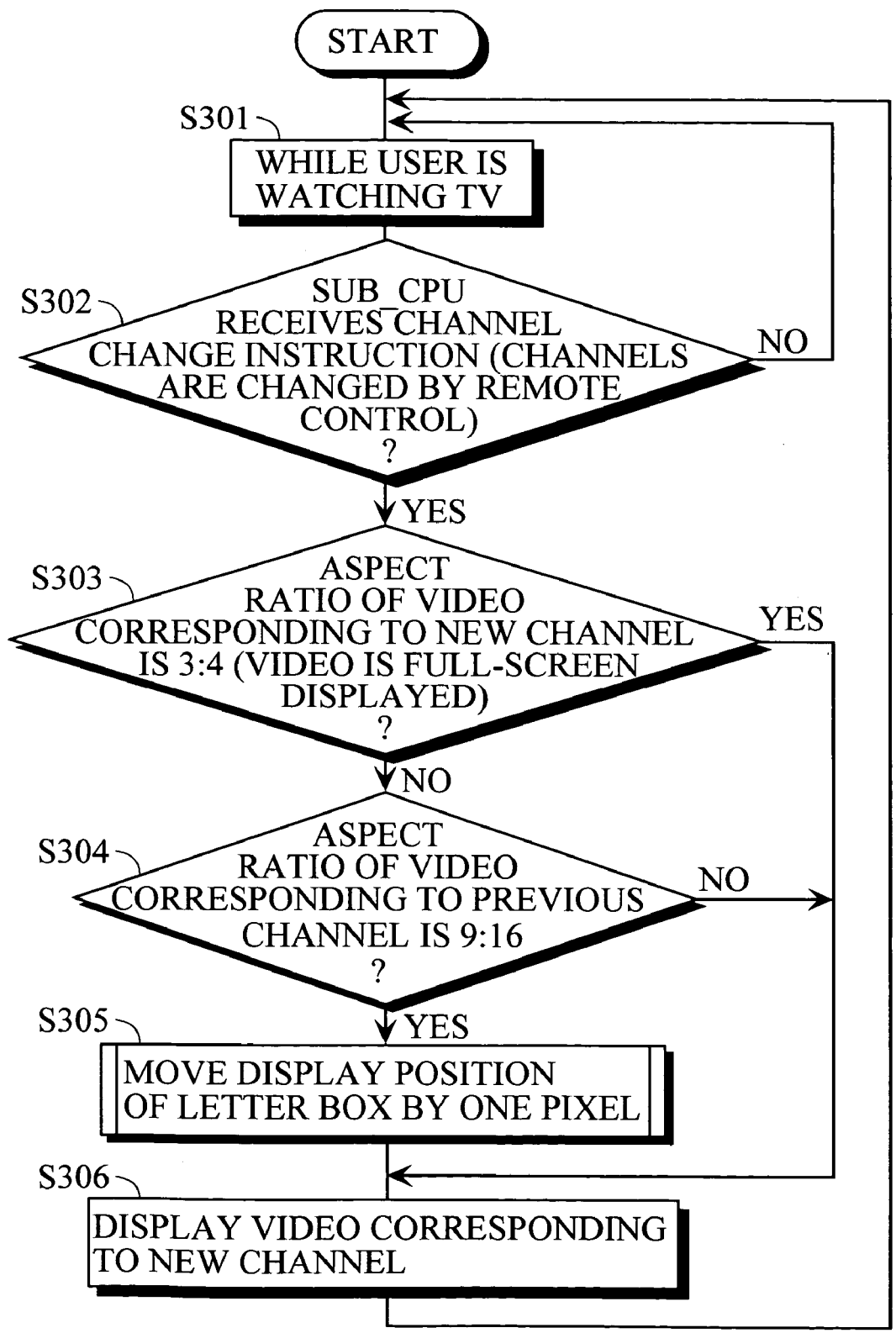
FIG. 3 is a flow chart showing the procedure for processing for controlling the display position of a letter box.

FIG. 3 shows the procedure for processing for controlling the display position of the letter box.

While a user is watching TV (step S301), when the channels are changed by operation buttons in the remote control or the main body of the television receiver (YES in step S302), it is judged whether or not the aspect ratio of a video corresponding to the new channel is 3:4 (whether or not the video is full-screen displayed) (step S303).

When the aspect ratio of the video corresponding to the new channel is 3:4 (the video is full-screen displayed) (YES in step S303), the new channel is selected, to display the video corresponding to the new channel (step S306). The procedure is returned to the step S301.

On the other hand, when the aspect ratio of the video corresponding to the new channel is not 3:4, that is, the aspect ratio of the video corresponding to the new channel is 9:16 (NO in step S303), it is judged whether or not the aspect ratio of a video corresponding to the previous channel is 9:16 (step S304).

When the aspect ratio of the video corresponding to the previous channel is not 9:16, that is, the aspect ratio of the video corresponding to the previous channel is 3:4 (NO in step S304), the display position of the letter box remains the position currently held, to display the video corresponding to the new channel (step S306). The procedure is returned to the step S301.

Figure 4:
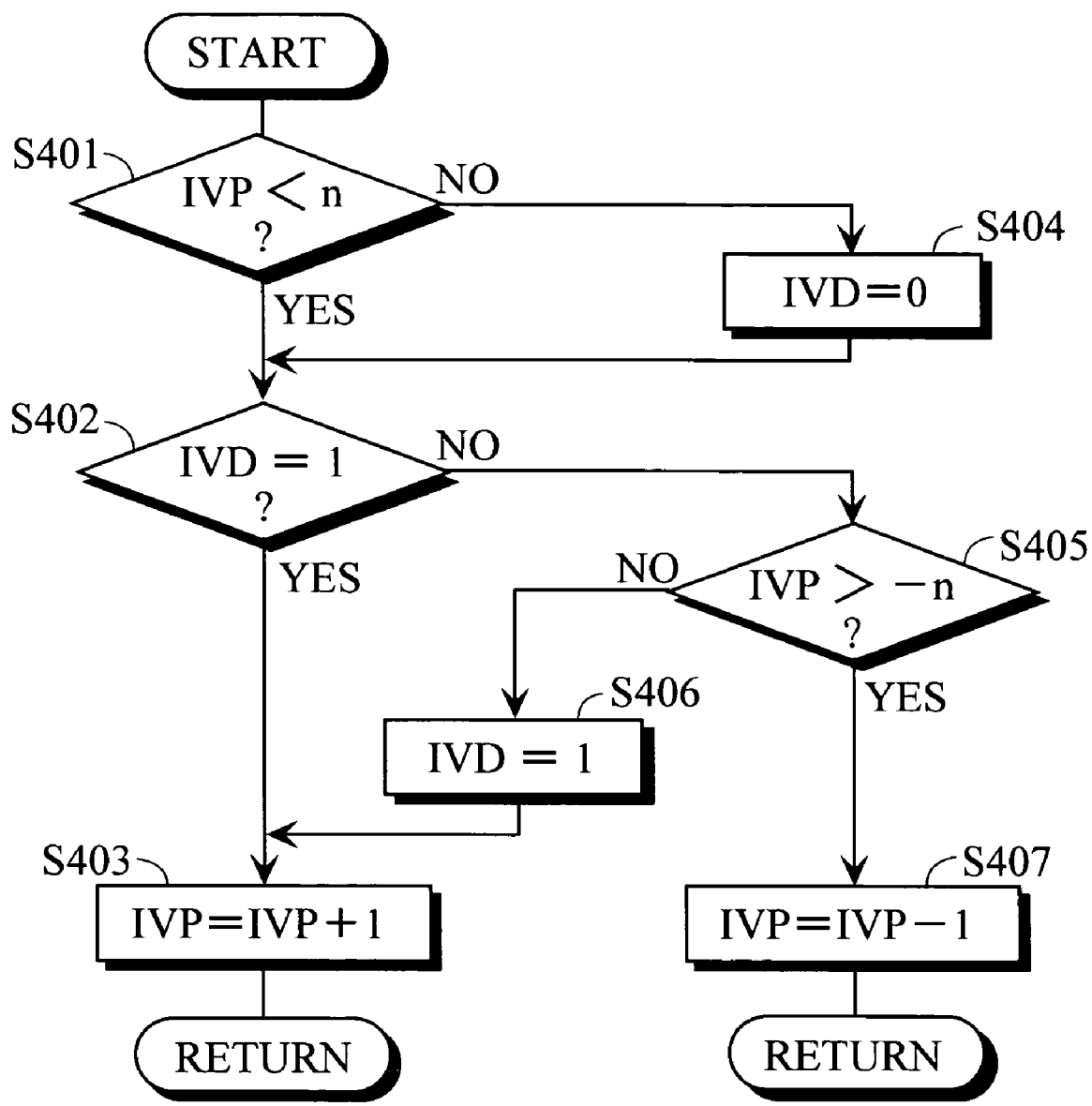
FIG. 4 is a flow chart showing the procedure for processing for moving the letter box which is performed in the step S305 shown in FIG. 3.

When the aspect ratio of the video corresponding to the previous channel is 9:16 in the foregoing step S304 (YES in step S304), that is, when the letter box is displayed on the previous channel and is also displayed on the new channel, the display position of the letter box is moved by one pixel in accordance with a flow chart of FIG. 4 (step S305), and the video corresponding to the new channel is displayed (step S306). The procedure is returned to the step S301.

FIG. 4 shows the procedure for processing for moving the letter box which is performed in the step S305 shown in FIG. 3.

Figure 5:
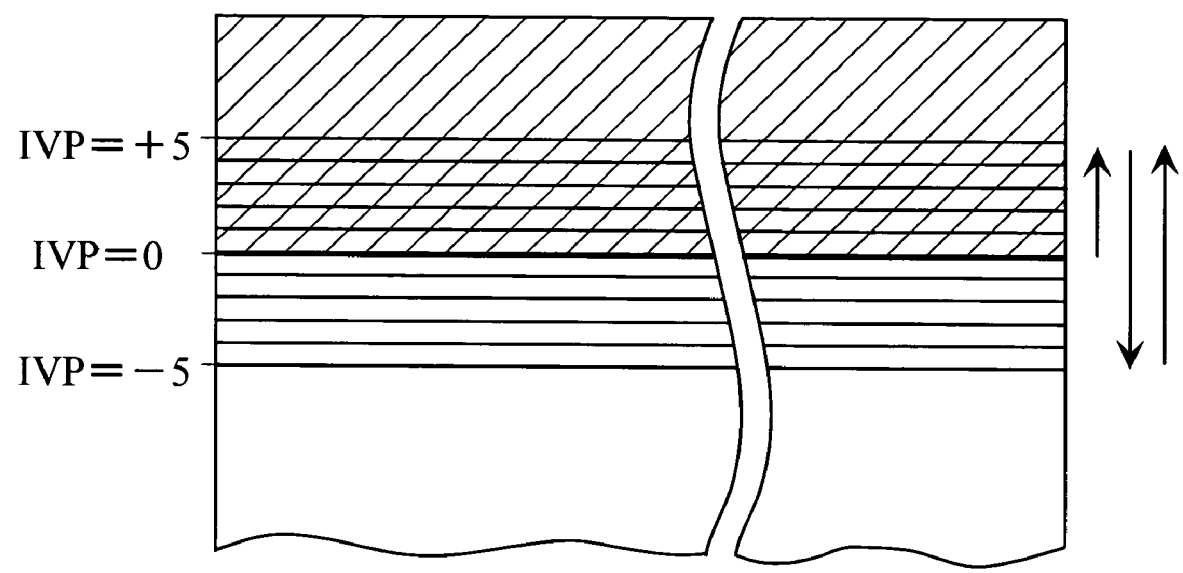
FIG. 5 is a schematic view for explaining processing for moving a letter box displayed on the upper side of a display area of a liquid crystal panel.

FIG. 5 illustrates the letter box displayed on the upper side of the display area of the liquid crystal panel. IVP is a variable representing the display position in the vertical direction of a lower edge of the letter box on the upper side. The position of the lower edge of the letter box on the upper side is moved in pixel units within a range of n pixels above and below the reference position (IVP=0). In this example, n is set to five. A range where the position of the lower edge of the letter box on the upper side is moved is from IVP=−5 to IVP=+5.

In this example, the position of the lower edge of the letter box on the upper side is moved in pixel units upward from the reference position (IVP=0), and is then moved in pixel units downward when it reaches IVP=5. When the position reaches IVP=−5, it is then moved in pixel units upward. IVD is used as a variable representing the current direction of movement. IVD=1 represents an upward direction, and IVD=0 represents a downward direction. When the power supply is turned on, IVP=0 and IVD=1 are set.

Even in the letter box on the lower side, a variable representing the display position in the vertical direction of an upper edge of the letter box on the lower side (a variable corresponding to the above-mentioned IVP) and a variable representing the direction of movement of the position of the upper edge of the letter box on the lower side (a variable corresponding to the above-mentioned IVD) are prepared for the purpose of movement processing.

Although description is made of only processing for moving the letter box on the upper side, processing for moving the letter box on the lower side is also similarly performed.

In the processing for moving the letter box on the upper side, it is judged whether or not the current IVP is less than n (+5 in this example) (step S401). When the IVP is not less than n (NO in step S401), that is, when IVP=+5, the variable IVD representing the direction of movement is set to one. Therefore, the variable IVD representing the direction of movement is set to zero (step S404). Thereafter, the procedure proceeds to the step S402. When it is judged in the foregoing step S401 that the IVP is less than n, that is, when the IVP is a value between −5 and +4, the procedure proceeds to the step S402.

It is judged in the step S402 whether or not the current IVD is one. That is, it is judged whether or not the direction of movement is an upward direction. When IVD=1 (YES in step S402), that is, when the direction of movement is an upward direction; the IVP is updated to (IVP+1) (step S403). Consequently, the display position of the letter box is moved by one pixel upward. The procedure is returned to the step S306 shown in FIG. 3.

When it is judged in the foregoing step S402 that IVD=0 (NO in step S402), that is, when the direction of movement is a downward direction, it is judged whether or not the IVP is more than −n (−5 in this example) (step S405). Unless the IVP is more than −n (−5 in this example) (NO in step S405), that is, when IVP=−5, the variable IVD representing the direction of movement is set to one. Therefore, the variable IVD representing the direction of movement is set to one (step S406), and the IVP is then updated to (IVP+1) (step S403). Consequently, the display position of the letter box is moved by one pixel upward. The procedure is returned to the step S306 shown in FIG. 3.

When it is judged in the foregoing step S405 that the IVP is more than −n (−5 in this example) (YES in step S405), that is, when the IVP is a value between −4 and +5, the IVP is updated to (IVP −1) (step S407). Consequently, the display position of the letter box is moved by one pixel downward. The procedure is returned to the step S306 shown in FIG. 3.

[1-2] Description of Case where there is Provided Liquid Crystal Panel Having Aspect Ratio of 9:16

It is assumed that the television receiver comprises a liquid crystal panel having an aspect ratio of 9:16. When a television program video having an aspect ratio of 9:16 is displayed, the television program video is displayed on the whole of a display area of the liquid crystal panel. When a television program video having an aspect ratio of 3:4 is displayed, the television program video is displayed inside both left and right side edges of the display area of the liquid crystal panel, and side panels 21 are respectively displayed in the left and right side edges of the display area of the liquid crystal panel, as shown in FIG. 1b.

Figure 1B:
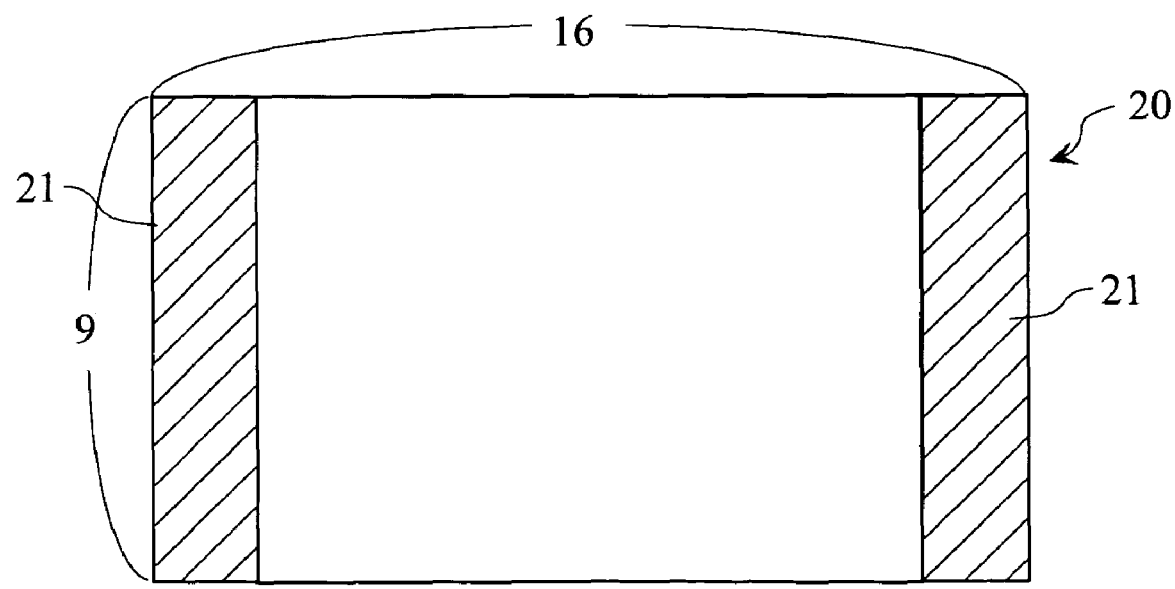

The side panels 21 are displayed, as shown in FIG. 1b, on the liquid crystal panel. When a channel change instruction signal is outputted to the SUB_CPU (104) from the remote control (not shown), the channel change instruction signal is outputted to the CPU (105) from the SUB_CPU (104).

The CPU (105) reads information related to the channel newly inputted, and judges whether or not side panels must be displayed on the new channel, as on the previous channel. When the side panels need not be displayed, the instruction signal is fed to the AV_DECODER (102) as usual, to display a designated program.

When it is judged that side panels must be also displayed on the new channel, as on the previous channel, the instruction signal is outputted from the CPU (105) to the AV_DE-CODER (102) such that the position of the side panel, which is displayed by the OSD, is slightly moved, as compared with the position where it is displayed on the previous channel. The AV_DECODER (102) which has received the instruction signal outputs to the NTSC encoder (103) the digital video signal in a state where the position of the side panel displayed on the previous channel is slightly shifted, and the NTSC encoder (103) which has received the digital video signal outputs the video and reflects the video on the TV set.

That is, when the channels are switched, the side panels are displayed before switching the channels. When the side panels are displayed even after switching the channels, the display position of the side panel is moved.

Figure 6:
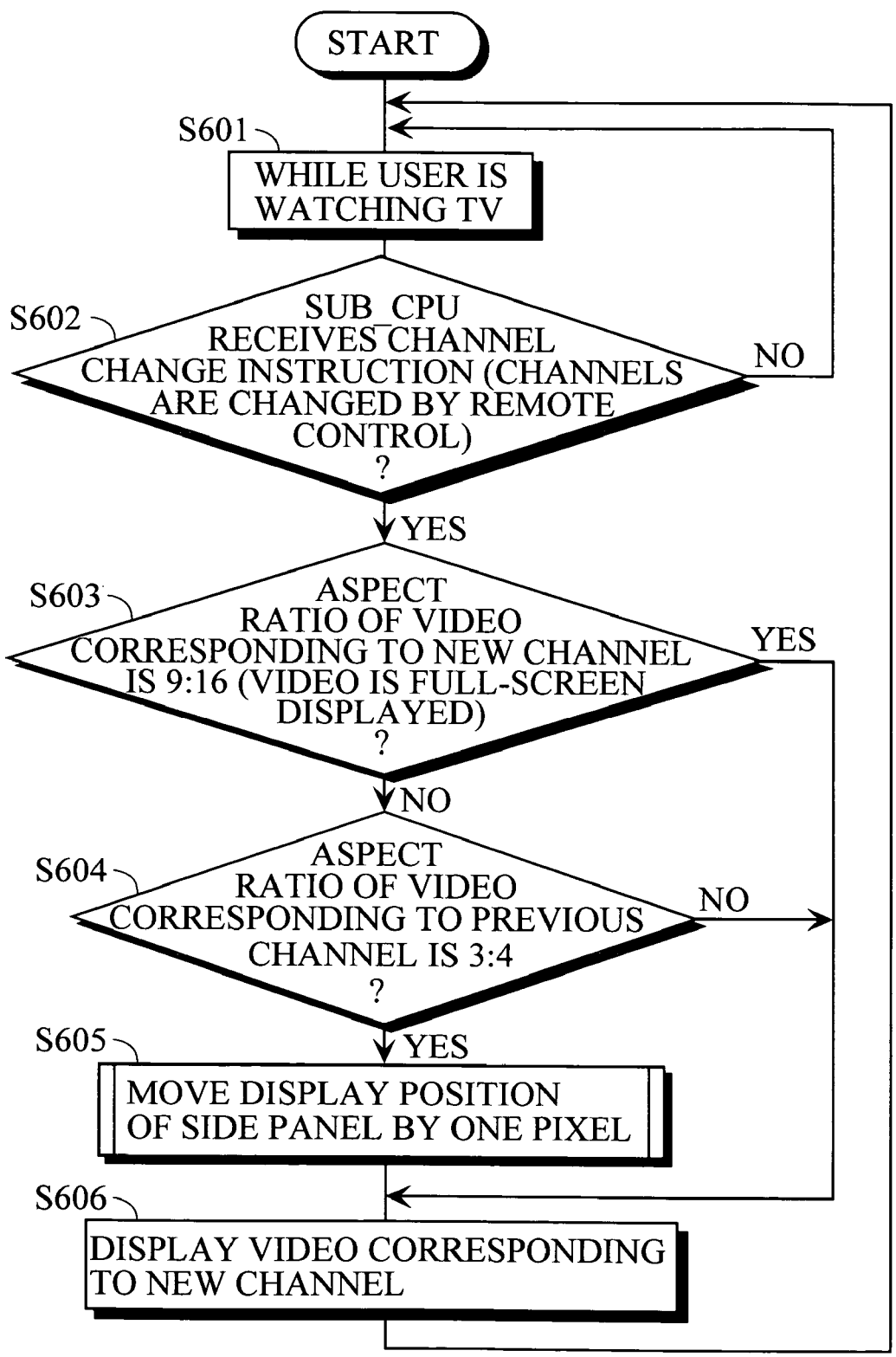
FIG. 6 is a flow chart showing the procedure for processing for controlling the display position of a side panel.

FIG. 6 shows the procedure for processing for controlling the display position of the side panel.

While a user is watching TV (step S601), when the channels are changed by the operation buttons in the remote control or the main body of the television receiver (YES in step S602), it is judged whether or not the aspect ratio of a video corresponding to the new channel is 9:16 (whether or not the video is full-screen displayed) (step S603).

When the aspect ratio of the video corresponding to the new channel is 9:16 (the video is full-screen displayed) (YES in step S603), the new channel is selected, to display the video corresponding to the new channel (step S606). The procedure is returned to the step S601.

On the other hand, when the aspect ratio of the video corresponding to the new channel is not 9:16, that is, the aspect ratio of the video corresponding to the new channel is 3:4 (NO in step S603), it is judged whether or not the aspect ratio of the video corresponding to the previous channel is 3:4 (step S604).

When the aspect ratio of the video corresponding to the previous channel is not 3:4, that is, the aspect ratio of the video corresponding to the previous channel is 9:16 (NO in step S604), the display position of the side panel remains the position currently held, to display the video corresponding to the new channel (step S606). The procedure is returned to the step S601.

Figure 7:
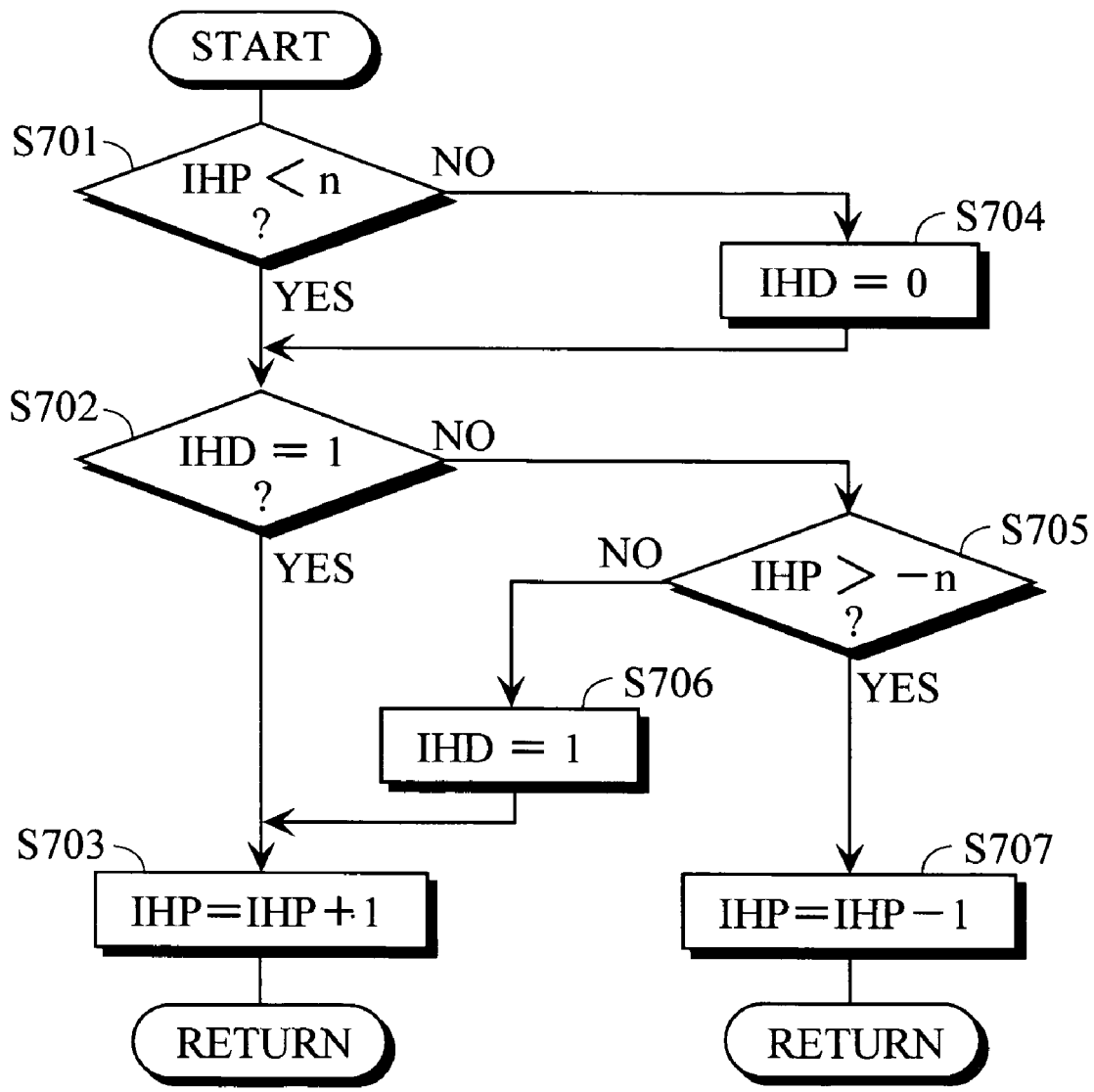
FIG. 7 is a flow chart showing the procedure for processing for moving the side panel which is performed in the step S605 shown in FIG. 6.

When the aspect ratio of the video corresponding to the previous channel is 3:4 in the foregoing step S604 (YES in step S604), that is, when the side panel is displayed on the previous channel and is also displayed on the new channel, the display position of the side panel is moved by one pixel in accordance with a flow chart of FIG. 7 (step S605), and the video corresponding to the new channel is displayed (step S606). The procedure is returned to the step S601.

FIG. 7 shows the procedure for processing for moving the side panel which is performed in the step S605 shown in FIG. 6.

Figure 8:
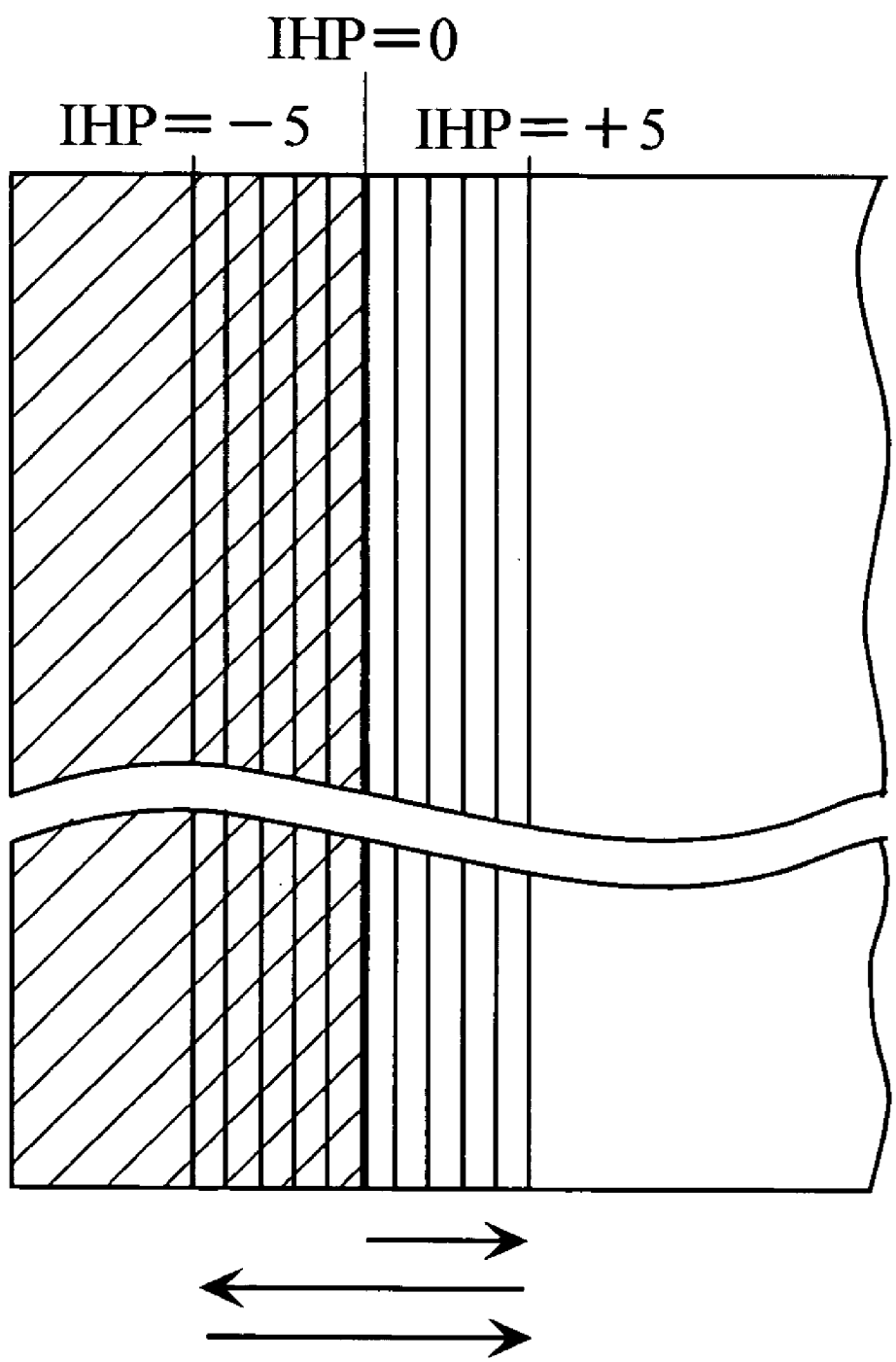
FIG. 8 is a schematic view for explaining processing for moving a side panel displayed on the left side of a display area of a liquid crystal panel.

FIG. 8 illustrates the side panel displayed on the left side of the display area of the liquid crystal panel. IHP is a variable representing the display position in the horizontal direction of a right edge of the side panel on the left side. The position of the right edge of the side panel on the left side is moved in pixel units within a range of n pixels at the right and left of the reference position (IHP=0). In this example, n is set to five. A range where the position of the right edge of the side panel on the left side is moved is from IHP=−5 to IHP=+5.

In this example, the position of the right edge of the side panel on the left side is moved in pixel units rightward from the reference position (IHP=0), and is then moved in pixel units leftward when it reaches IHP=+5. When the position reaches IHP=−5, it is then moved in pixel units rightward. IHD is used as a variable representing the current direction of movement. IHD=1 represents a rightward direction, and IHD=0 represents a leftward direction. When the power supply is turned on, IHP=0 and IHD=1 are set.

Even in the side panel on the right side, a variable representing the display position in the horizontal direction of a left edge of the side panel on the right side (a variable corresponding to the above-mentioned IHP) and a variable representing the direction of movement of the position of the left edge of the side panel on the right side (a variable corresponding to the above-mentioned IHD) are prepared for the purpose of movement processing.

Although description is made of only processing for moving the side panel on the left side, processing for moving the side panel on the right side is also similarly performed.

In the processing for moving the side panel on the left side, it is judged whether or not the current IHP is less than n (+5 in this example) (step S701). When the IHP is not less than n (NO in step S701), that is, when IHP=+5, the variable IHD representing the direction of movement is set to one. Therefore, the variable IHD representing the direction of movement is set to zero (step S704). Thereafter, the procedure proceeds to the step S702. When it is judged in the foregoing step S701 that the IHP is less than n, that is, when the IHP is a value between −5 and +4, the procedure proceeds to the step S702.

It is judged in the step S702 whether or not the current IHD is one. That is, it is judged whether or not the direction of movement is a rightward direction. When IHD=1 (YES in step S702), that is, when the direction of movement is a rightward direction, the IHP is updated to (IHP+1) (step S703). Consequently, the display position of the side panel is moved by one pixel rightward. The procedure is returned to the step S606 shown in FIG. 6.

When it is judged in the foregoing step S702 that IHD =0 (NO in step S702), that is, when the direction of movement is a leftward direction, it is judged whether or not the IHP is more than −n (−5 in this example) (step S705). Unless the IHP is more than −n (−5 in this example) (NO in step S705) that is, when IHP=−5, the variable IHD representing the direction of movement is set to one. Therefore, the variable IHD representing the direction of movement is set to one (step S706), and the IHP is then updated to (IHP+1) (step S703) Consequently, the display position of the side panel is moved by one pixel rightward. The procedure is returned to the step S606 shown in FIG. 6.

When it is judged in the foregoing step S705 that the IHP is more than −n (−5 in this example) (YES in step S705) that is, when the IHP is a value between −4 and +5, the IHP is updated to (IHP−1) (step S707). Consequently, the display position of the side panel is moved by one pixel leftward. The procedure is returned to the step S606 shown in FIG. 6.

[2] Description of Second Embodiment

Figure 9:
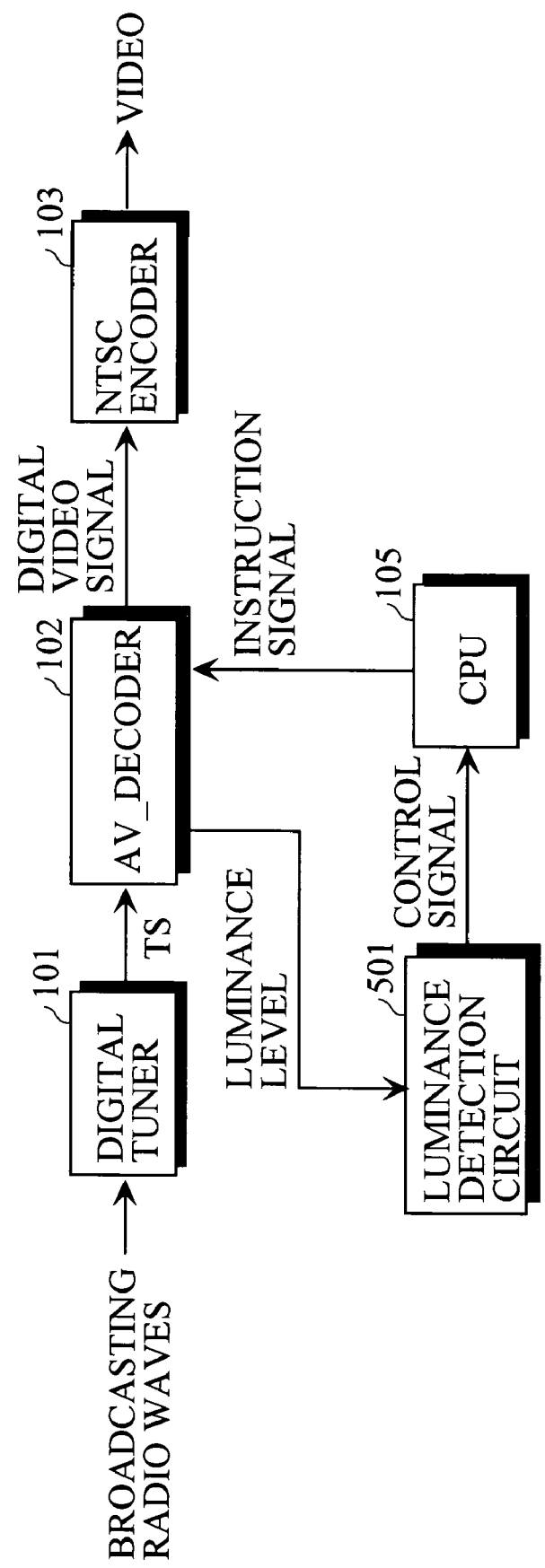
FIG. 9 is a block diagram showing the configuration of a television receiver according to a second embodiment.

FIG. 9 illustrates the configuration of a television receiver according to a second embodiment. In FIG. 9, the same units as those shown in FIG. 2 are assigned same reference numerals.

The television receiver according to the second embodiment is provided with a luminance detection circuit (501).

The television receiver also comprises the function of performing an image reproducing operation on the basis of a high-definition television video signal having an aspect ratio of 9:16 and the function of performing an image reproducing operation on the basis of an NTSC video signal having an aspect ratio of 3:4.

Broadcasting radio waves are inputted to a digital TUNER (101), and a TS is outputted to an AV_DECODER (102) from the digital TUNER (101). The AV_DECODER (102) which has received the TS outputs a digital video signal to an NTSC encoder (103). The NTSC encoder (103) which has received the digital video signal outputs a video.

[2-1] Description of Case where there is Provided Liquid Crystal Panel Having Aspect Ratio of 3:4, and Letter Boxes are Displayed when Video Having Aspect Ratio of 9:16 is Displayed When a program on which letter boxes are displayed is presented, the AV_DECODER (102) outputs to the luminance detection circuit (501) luminance levels at respective addresses in upper and lower side edges of a television program video (addresses in the vicinity of the boundaries between the television program video and the letter boxes). Here, the addresses to be objects are respectively areas, each having a width corresponding to five pixels, composed of the upper and lower side edges of the television program video, for example. Although the width of the object area is set to a width corresponding to five pixels, the width is not limited to the same.

The luminance detection device (501) calculates the average value of the luminance levels sent from the AV_DECODER (102), and gives the calculated average value to a CPU (105). The CPU (105) judges whether or not the average value of the luminances which is given from the luminance detection device (501) is lower than a predetermined value (whether or not it is close to the luminance level of the letter box). In a case where it is judged that the average value of the luminances is lower than the predetermined value, even if the letter box is moved, the movement is inconspicuous. Therefore, such an instruction signal as to move the display position of the letter box is outputted to the AV_DECODER (102). The AV_DECODER (102) which has received the instruction signal outputs to the NTSC encoder (103) the digital video signal in a state where the position of the displayed letter box is slightly shifted, and the NTSC encoder (103) which has received the digital video signal outputs the video and reflects the video on a TV set.

Figure 10:
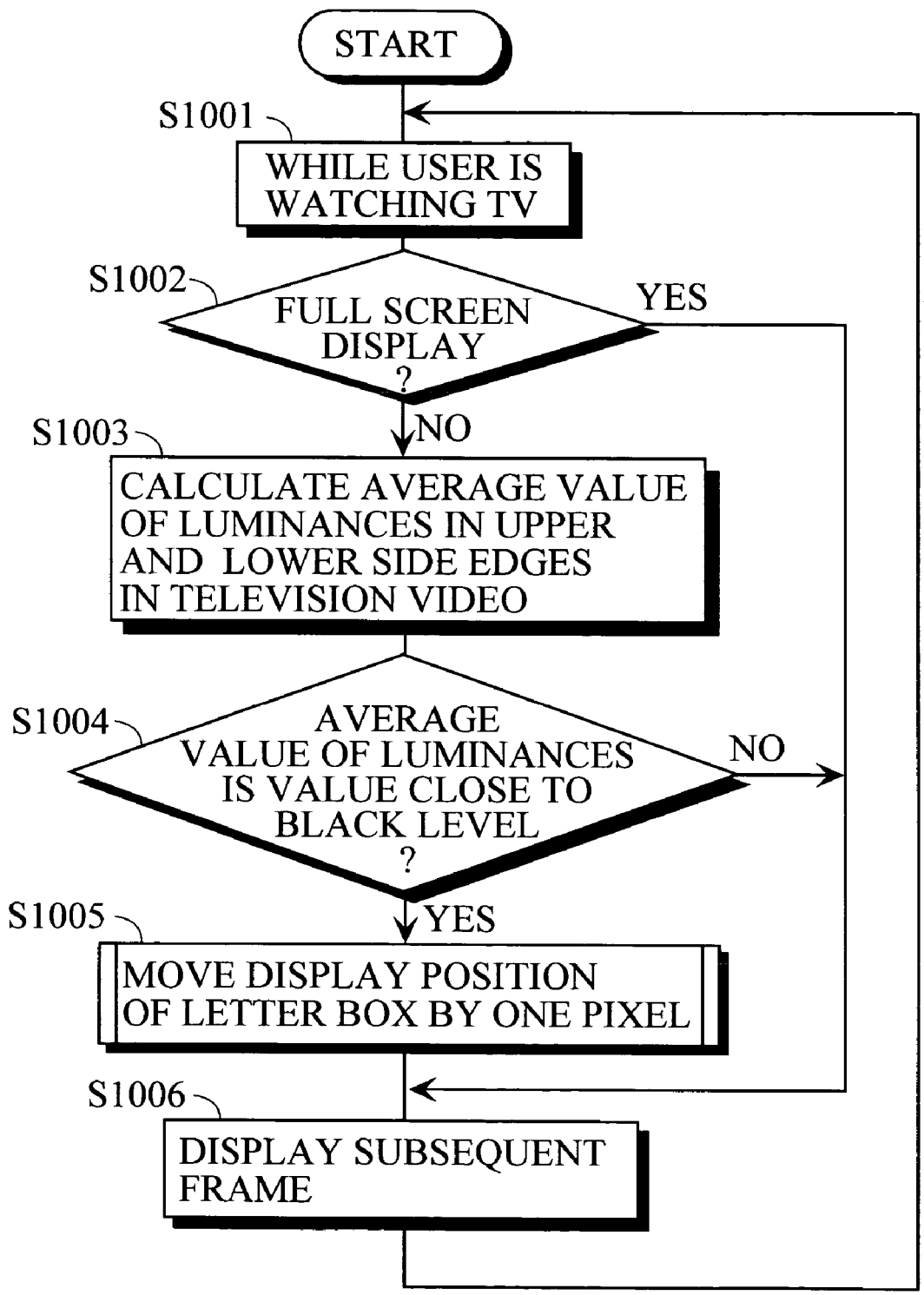
FIG. 10 is a flow chart showing the procedure for processing for controlling the display position of a letter box.

FIG. 10 shows the procedure for processing for controlling the display position of the letter box.

While a user is watching TV (step S1001), it is judged whether or not the display of a program which is being currently viewed is full screen display (the aspect ratio of a video is 3:4) (step S1002).

When the display of the program which is being currently viewed is full screen display, that is, when no letter boxes are displayed, the subsequent frame is displayed as it is (step S1006). The procedure is returned to the step S1001.

On the other hand, when the display of the program which is being currently viewed is not full screen display (NO in step S1002), that is, the aspect ratio of the video is 9:16, and letter boxes are displayed, the average value of luminances in upper and lower side edges of a television program video currently displayed is calculated by the luminance detection circuit (501), and is sent to the CPU (105) (step S1003).

The CPU (105) judges whether or not the average value of the luminances is a value close to the black level (lower than a predetermined value) (step S1004). Here, judgment as to how the value close to the black level is to be defined may be freely settable by the user, or may be determined depending on the sensitivity of a designer and set at the time of shipping from a factory. When the average value of the luminances is not the value close to the black level (NO in step S1004), the subsequent frame is displayed as it is (step S1006). The procedure is returned to the step S1001.

When it is judged that the average value of the luminances is the value close to the black level, that is, the respective boundaries between the upper and lower side edges of the television program video and the letter boxes are indistinct, the display position of the letter box is moved by one pixel in accordance with the flow chart of FIG. 4 (step S1005), and the subsequent frame is then displayed (step S1006). The procedure is returned to the step S1001.

[2-2] Description of Case where there is Provided Liquid Crystal Panel Having Aspect Ratio of 9:16, and Side Panels are Displayed when Video Having Aspect Ratio of 3:4 is Displayed When a program on which side panels are displayed is presented, the AV_DECODER (102) outputs to the luminance detection circuit (501) luminance levels at addresses in left and right side edges of a television program video (addresses in the vicinity of the boundaries between the television program video and the side panels). Here, the addresses to be objects are respectively areas, each having a width corresponding to five pixels, composed of the left and right side edges of the television program video, for example.

The luminance detection device (501) calculates the average value of the luminance levels sent from the AV_DECODER (102), and gives the calculated average value to the CPU (105). The CPU (105) judges whether or not the average value of the luminances which is given from the luminance detection device (501) is lower than a predetermined value (whether or not it is close to the luminance level of the side panel). In a case where it is judged that the average value of the luminances is lower than the predetermined value, even if the side panel is moved, the movement is inconspicuous. Therefore, such an instruction signal as to move the display position of the side panel is outputted to the AV_DECODER (102). The AV_DECODER (102) which has received the instruction signal outputs to the NTSC encoder (103) the digital video signal in a state where the position of the displayed side panel is slightly shifted, and the NTSC encoder (103) which has received the digital video signal outputs the video and reflects the video on the TV set.

Figure 11:
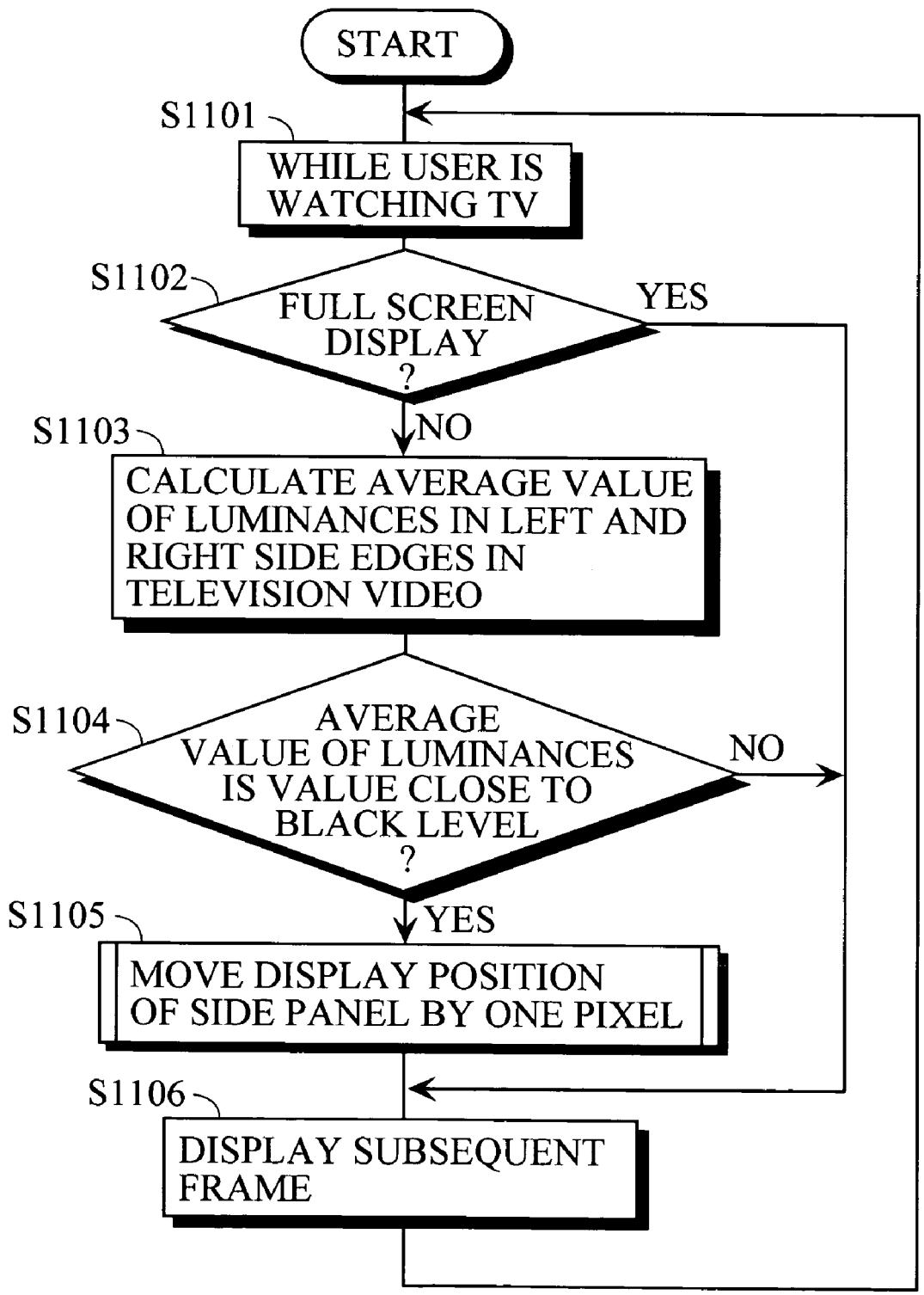
FIG. 11 is a flow chart showing the procedure for processing for controlling the display position of a side panel.

FIG. 11 shows the procedure for processing for controlling the display position of the side panel.

While a user is watching TV (step S1101), it is judged whether or not the display of a program which is being currently viewed is full screen display (the aspect ratio of a video is 9:16) (step S1102).

When the display of the program which is being currently viewed is full screen display, that is, when no side panels are displayed, the subsequent frame is displayed as it is (step S1106). The procedure is returned to the step S1101.

On the other hand, when the display of the program which is being currently viewed is not full screen display (NO in step S1102), that is, the aspect ratio of the video is 3:4, and side panels are displayed, the average value of luminances in left and right side edges of a television program video currently displayed is calculated by the luminance detection circuit (501), and is sent to the CPU (105) (step S1103).

The CPU (105) judges whether or not the average value of the luminances is a value close to the black level (lower than a predetermined value) (step S1104). When the average value of the luminances is not the value close to the black level (NO in step S1104), the subsequent frame is displayed as it is (step S1106). The procedure is returned to the step S1101.

When it is judged that the average value of the luminances is the value close to the black level, that is, the respective boundaries between the left and right side edges of the television program video and the side panels are indistinct, the display position of the side panel is moved by one pixel in accordance with the flow chart of FIG. 7 (step S1105), and the subsequent frame is then displayed (step S1106). The procedure is returned to the step S1101.

[3] Description of Third Embodiment

Figure 12:
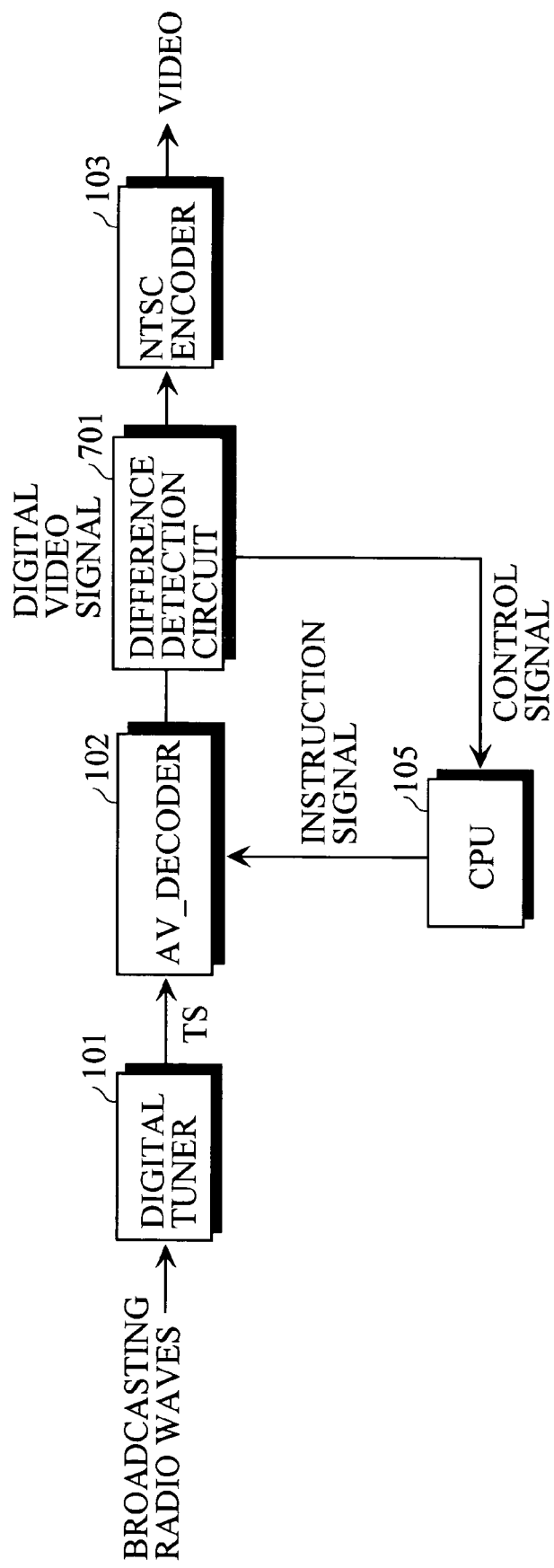
FIG. 12 is a block diagram showing the configuration of a television receiver according to a third embodiment.

FIG. 12 illustrates the configuration of a television receiver according to a third embodiment. In FIG. 12, the same units as those shown in FIG. 2 are assigned same reference numerals.

The television receiver according to the third embodiment is provided with a difference detection circuit (701) for detecting that a scene change occurs.

Broadcasting radio waves are inputted to a digital TUNER (101), and a TS is outputted to an AV_DECODER (102) from the digital TUNER (101). The AV_DECODER (102) which has received the TS outputs a digital video signal to an NTSC encoder (103). The NTSC encoder (103) which has received the digital video signal outputs a video.

[3-1] Description of Case where there is Provided Liquid Crystal Panel Having Aspect Ratio of 3:4, and Letter Boxes are Displayed when Video Having Aspect Ratio of 9:16 is Displayed When a program on which letter boxes are displayed is presented, the digital video signal outputted from the AV_DECODER (102) is fed to the difference detection circuit (701), and is outputted to the NTSC encoder (103) through the difference detection circuit (701).

The difference detection circuit (701) calculates the difference between the accumulated value (or the average value) of luminances in pixel units of a video in the preceding frame and the accumulated value (or the average value) of luminances in pixel units of a video in the current frame, and sends the difference to the CPU (105).

The CPU (105) judges whether or not the difference between the accumulated values (or the average values) of the luminances in pixel units which is sent from the difference detection circuit (701) is more than a predetermined threshold value. When the difference between the accumulated values (or the average values) of the luminances in pixel units is more than the threshold value, it is judged that a scene change occurs. Therefore, such an instruction signal as to move the display position of the letter box is outputted to the AV_DECODER (102). The AV_DECODER (102) which has received the instruction signal outputs to the NTSC encoder (103) the digital video signal in a state where the position of the displayed letter box is slightly shifted, and the NTSC encoder (103) which has received the digital video signal outputs the video and reflects the video on a TV set.

Figure 13:
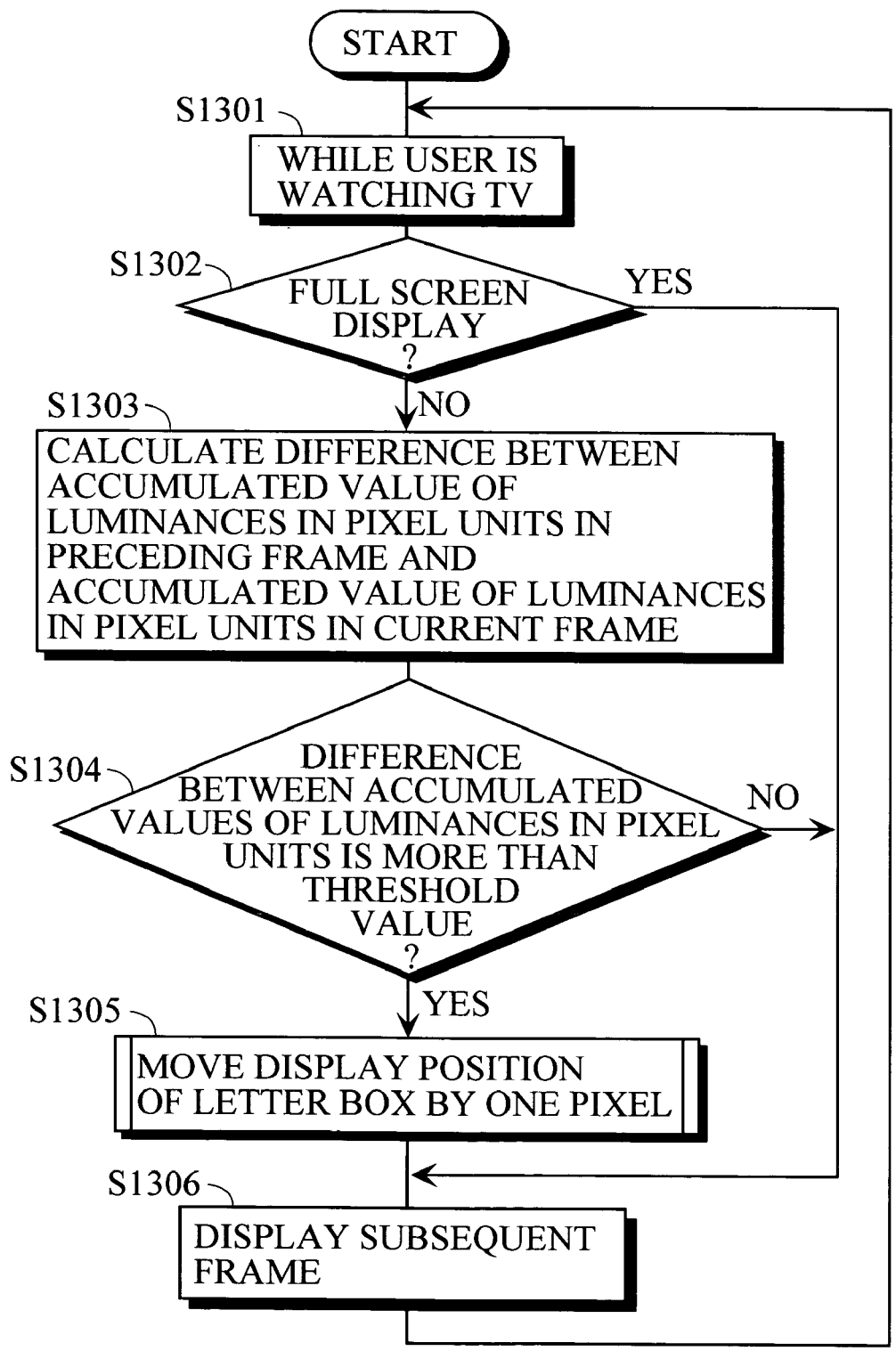
FIG. 13 is a flow chart showing the procedure for processing for controlling the display position of a letter box.

FIG. 13 shows the procedure for processing for controlling the display position of the letter box.

While a user is watching TV (step S1301), it is judged whether or not the display of a program which is being currently viewed is full screen display (the aspect ratio of a video is 3:4) (step S1302).

When the display of the program which is being currently viewed is full screen display, that is, when no letter boxes are displayed, the subsequent frame is displayed as it is (step S1306). The procedure is returned to the step S1001.

On the other hand, when the display of the program which is being currently viewed is not full screen display (NO in step S1302), that is, the aspect ratio of the video is 9:16, and letter boxes are displayed, the difference between the accumulated value of the luminances in pixel units in the preceding frame and the accumulated value of the luminances in pixel units in the current frame is calculated by the difference detection circuit (701), and is sent to the CPU (105) (step S1303).

The CPU (105) judges whether or not the difference between the accumulated values of the luminances in pixel units which is calculated by the difference detection circuit (701) is more than a predetermined threshold value (step S1304). Although judgment how the threshold value is determined is set at the time of shipping from a factory depending on the sensitivity of a designer, a value is basically set such that a case where the contents of an image are greatly changed in frame units, for example, a case where a scene change occurs can be detected.

When the difference between the accumulated values of the luminances in pixel units is less than the threshold value (NO in step S1304), the subsequent frame is displayed as it is (step S1306). The procedure is returned to the step S1301.

When it is judged that the difference between the accumulated values of the luminances in pixel units is more than the threshold value, the display position of the letter box is moved by one pixel in accordance with the flow chart of FIG. 4 (step S1305), and the subsequent frame is then displayed (step S1306). The procedure is returned to the step S1301.

[3-2] Description of Case where there is Provided Liquid Crystal Panel Having Aspect Ratio of 9:16, and Side Panels are Displayed when Video Having Aspect Ratio of 3:4 is Displayed When a program on which side panels are displayed is presented, the digital video signal outputted from the AV_DECODER (102) is fed to the difference detection circuit (701), and is outputted to the NTSC encoder (103) through the difference detection circuit (701).

The difference detection circuit (701) calculates the difference between the accumulated value (or the average value) of luminances in pixel units of a video in the preceding frame and the accumulated value (or the average value) of luminances in pixel units of a video in the current frame, and sends the difference to the CPU (105).

The CPU (105) judges whether or not the difference between the accumulated values (or the average values) of the luminances in pixel units which is sent from the difference detection circuit (701) is more than a predetermined threshold value. When it is judged that the difference between the accumulated values (or the average values) of the luminances in pixel units is more than the threshold value, it is judged that a scene change occurs. Therefore, such an instruction signal as to move the display position of the side panel is outputted to the AV_DECODER (102). The AV_DECODER (102) which has received the instruction signal outputs to the NTSC encoder (103) the digital video signal in a state where the position of the displayed side panel is slightly shifted, and the NTSC encoder (103) which has received the digital video signal outputs the video and reflects the video on the TV set.

Figure 14:
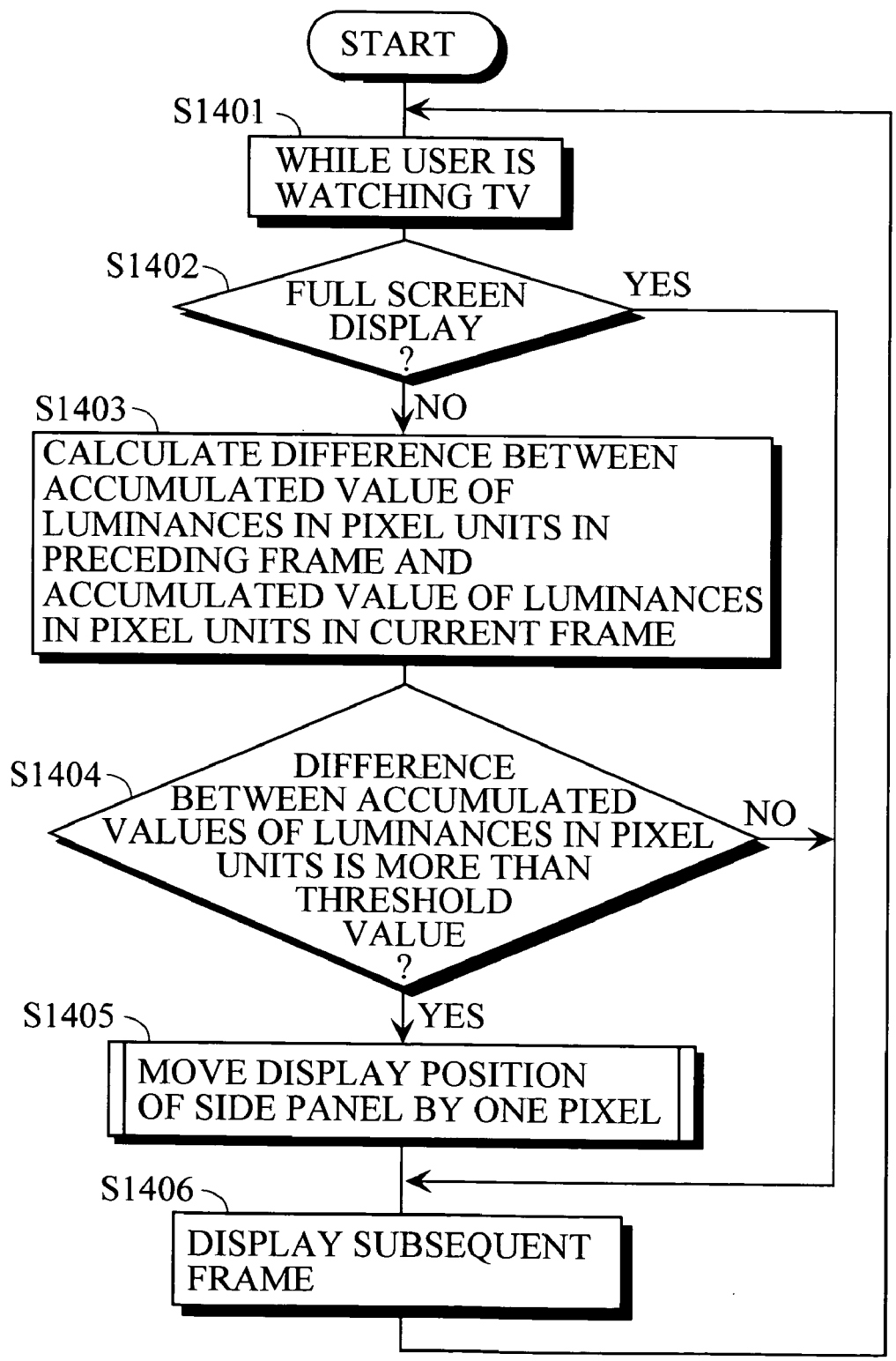
FIG. 14 is a flow chart showing the procedure for processing for controlling the display position of a side panel.

FIG. 14 shows the procedure for processing for controlling the display position of the side panel.

While a user is watching TV (step S1401), it is judged whether or not the display of a program which is being currently viewed is full screen display (the aspect ratio of a video is 9:16) (step S1402).

When the display of the program which is being currently viewed is full screen display, that is, when no side panels are displayed, the subsequent frame is displayed as it is (step S1406). The procedure is returned to the step S1401.

On the other hand, when the display of the program which is being currently viewed is not full screen display (NO in step S1402), that is, the aspect ratio of the video is 3:4, and side panels are displayed, the difference between the accumulated value of the luminances in pixel units in the preceding frame and the accumulated value of the luminances in pixel units in the current frame is calculated by the difference detection circuit (701), and is sent to the CPU (105) (step S1403).

The CPU (105) judges whether or not the difference between the accumulated values of the luminances in pixel units which is calculated by the difference detection circuit (701) is more than a predetermined threshold value (step S1404). Although judgment as to how the threshold value is determined is set at the time of shipping from a factory depending on the sensitivity of a designer, a value is basically set such that a case where the contents of an image are greatly changed in frame units, for example, a case where a scene change occurs can be detected.

When the difference between the accumulated values of the luminances in pixel units is less than the threshold value (NO in step S1404), the subsequent frame is displayed as it is (step S1406). The procedure is returned to the step S1401.

When it is judged that the difference between the accumulated values of the luminances in pixel units is more than the threshold value, the display position of the side panel is moved by one pixel in accordance with the flow chart of FIG. 7 (step S1405), and the subsequent frame is then displayed (step S1406). The procedure is returned to the step S1401.

Although in the above-mentioned first to third embodiments, an example in which an image based on an NTSC system is displayed is illustrated, the present invention is not limited to the image based on an NTSC system. Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television receiver having the function of displaying a plurality of types of television program videos which differ in the aspect ratio, comprising:

means for judging, when channels are switched, whether or not a letter box is displayed on the previous channel and is also displayed on the new channel; and means for moving, in response to judging that the letter box is displayed on the previous channel and is also displayed on the new channel, the position of the letter box displayed on the new channel from the position of the letter box displayed on the previous channel.

2. A television receiver having the function of displaying a plurality of types of television program videos which differ in the aspect ratio, comprising:

means for judging, when channels are switched, whether or not a side panel is displayed on the previous channel and is also displayed on the new channel; and means for moving, in response to judging that the side panel is displayed on the previous channel and is also displayed on the new channel, the position of the side panel displayed on the new channel from the position of the side panel displayed on the previous channel.

3. A television receiver having the function of displaying a plurality of types of television program videos which differ in the aspect ratio, comprising:
- calculation means for calculating, when a letter box is displayed, the average value of luminances in areas respectively composed of upper and lower side edges in the television program video; and
- means for moving the display position of the letter box by only one pixel in response to the calculation means calculating that the average value of the luminances is lower than a predetermined value.

4. A television receiver having the function of displaying a plurality of types of television program videos which differ in the aspect ratio, comprising:
- calculation means for calculating, when a side panel is displayed, the average value of luminances in areas respectively composed of left and right side edges in the television program video; and
- means for moving the display position of the side panel by only one pixel in response to the calculation means calculating that the average value of the luminances is lower than a predetermined value.

5. A television receiver having the function of displaying a plurality of types of television program videos which differ in the aspect ratio, comprising:
- a difference detection device to calculate, when a letter box is displayed, a difference between an accumulated value or an average value of luminances in pixel units of a video in a preceding frame and an accumulated value or average value of luminances in pixel units of a video in a current frame;
- a processor to receive the difference calculated by the difference detection device and to determine that a scene change has occurred when the difference is more than a predetermined threshold; and
- means for moving a display position of the letter box in response to the processor determining that the scene change occurred.

6. A television receiver having the function of displaying a plurality of types of television program videos which differ in the aspect ratio, comprising:
- a difference detection device to calculate, when a side panel is displayed, a difference between an accumulated value or an average value of luminances in pixel units of a video in a preceding frame and an accumulated value or average value of luminances in pixel units of a video in a current frame;
- a processor to receive the difference calculated by the difference detection device and to determine that a scene change has occurred when the difference is more than a predetermined threshold; and
- means for moving a display position of the side panel in response to the processor determining that the scene change occurred.

* * * * *